Nov. 19, 1968   M. A. OTAVKA   3,412,234
HEATER ELEMENT AND PORTABLE HEATED CONTAINER
Filed Oct. 25, 1966
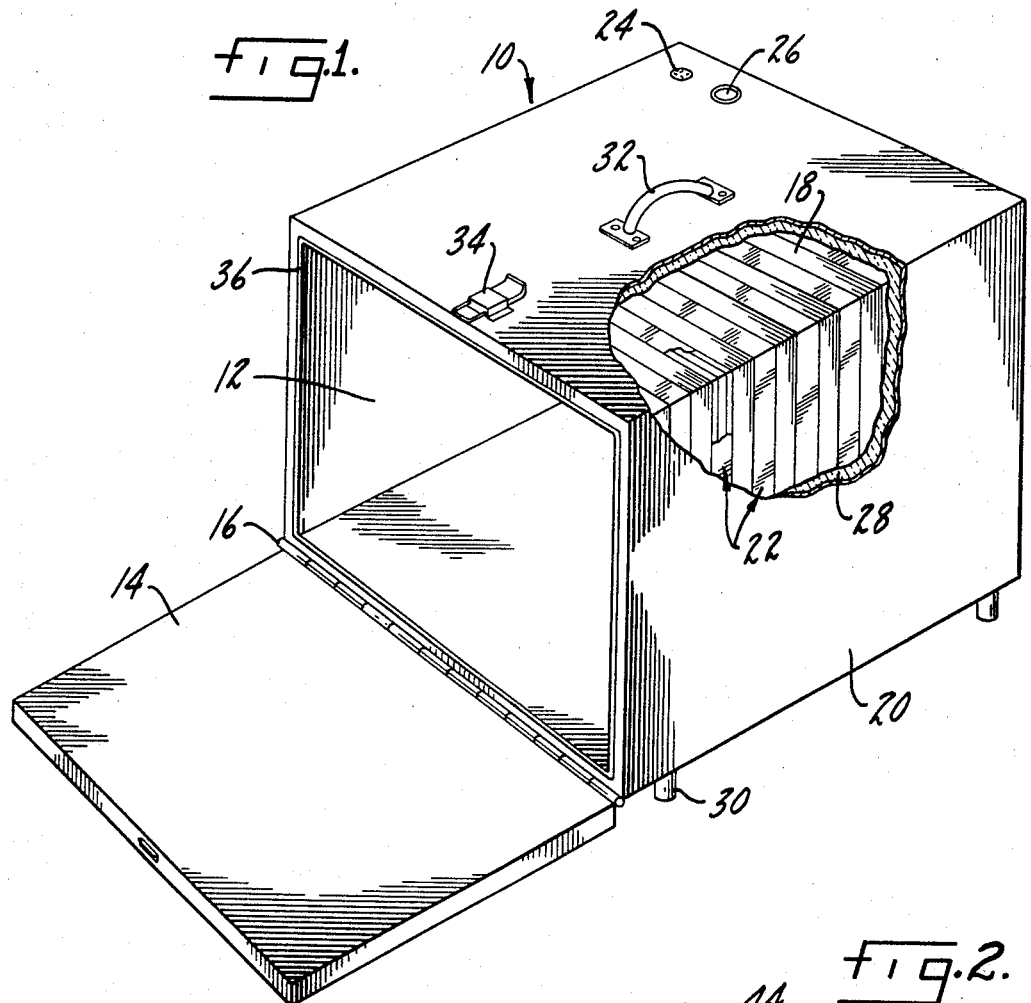
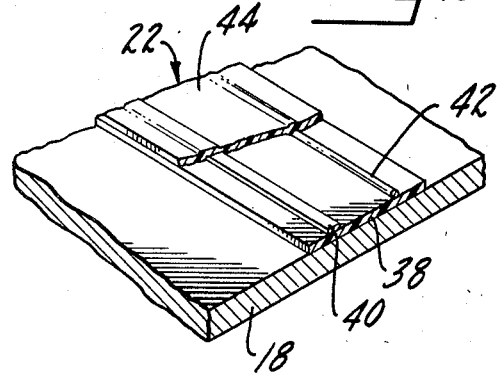
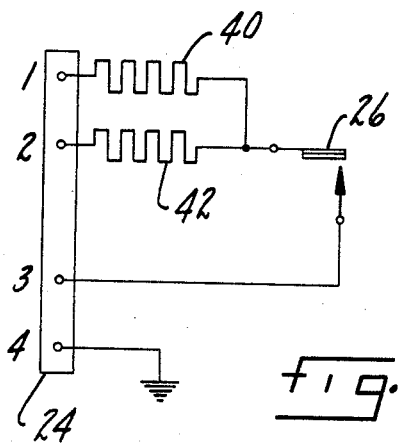
INVENTOR.
Michael A. Otavka,
BY Parker & Carter
Attorneys.

3,412,234
HEATER ELEMENT AND PORTABLE HEATED CONTAINER
Michael A. Otavka, 8016 Highland Ave., Downers Grove, Ill. 60515
Filed Oct. 25, 1966, Ser. No. 589,353
5 Claims. (Cl. 219—406)

This invention is in the field of heated containers and is primarily concerned with a flexible resistive electrical heating element for use in a portable food preheater or warmer. Howeved, it should be understood that this invention may be used as well in other container applications which require heating.

A primary object of this invention is an inexpensive, easily fabricated, flexible, self-supportnig and adhering heater element.

Another object is a heater element having multiple electrical conductors, each of which has a different resistance rating and is designed to operate with a specific voltage power source.

Another object is a sealed heating element having adhesive on at least one side thereof.

Another object is a portable food preheater or warmer having uniform heating characteristics.

Another object is a rugged, easily fabricated, portable food preheater or warmer which may be operated from multiple voltage power sources such as automobile, boat, truck, or household power.

Another object is a portable food preheater or warmer having fast container warmup.

Another object is a container having uniform heating characteristics.

Another object is a heating element which economically provides flexibility in length and wattage rating of such element.

Other objects will appear from time to time in the ensuing specification and drawings in which:

FIGURE 1 is a perspective view in partial cross-section of an exemplary form of the heated container of this invention;

FIGURE 2 is an enlarged view in partial cross-section, with portions broken away, showing an exemplary form of the heater element of this invention; and FIGURE 3 is a wiring schematic of the exemplary heated container of FIGURE 1.

Referring now to the drawings and particularly to FIGURE 1, an exemplary form of the heated container of this invention has been shown as consisting of a container 10 having an opneing 12, with a closure member or door 14 swingably attached to said container by a hinge 16 so that said door may be closed upon the opening 12 thereby forming a generally sealed enclosure. Although the container 10 has been depicted as being generally square in cross-section and horizontal loading, it should be understood that the container may be otherwise configured, for example, it might be circular in cross-section and vertical loading.

The container 10 and door 14 are formed by an inner wall, such as at 18, and a spaced outer wall, such as at 20.

An elongated electrical heater element, shown generally at 22, is wrapped around the external surface of the inner wall 18 and attached and retained thereto by adhesive existing on the side of said heater element which contacts the external surface of the inner wall.

A connetcor receptacle 24 and a temperature sensing regulating element or thermostat 26 are electrically connected to the heater element 22 in accordance with the wiring schematic of FIGURE 3. The thermostat 26 may be either fixed or variable. If the thermostat is of the variable type, such thermostat would be mounted so as to be accessible, thereby permitting manual temperature selection.

Thermal insulation 28 is placed within the cavity formed by the inner wall 18 and spaced outer wall 20. The portable container may be provided with feet 30 upon which the container will stand; a handle 32 for use in transporting such container; and a hasp 34 for use in fastening or retaining the closure member or door 14 in its closed position. A gasket 36 may be provided around the periphery of the opening 12 so as to form a seal when the door is closed upon the opening 12.

Referring now to FIGURE 2, an exemplary form of the heater element of this invention is shown generally at 22. Such heater element comprises a first elongated strip of electrical insualting material 38 having adhesive on both sides thereof; resistive electrical conductors 40 and 42 adhered to the tape strip 38 in spaced parallel relationship, with such conductors being generally parallel to and co-extensive with said tape strip 38; and a second electrical insulating tape strip 44, having adhesive on at least one side thereof, overlying and adhering to the conductors 40 and 42 and tape strip 38 being substantially co-extensive therewith. A variety of materials may be utilized for the tape strips 38 and 44. For example, the tape strips may be a silicone-bonded glass cloth backed mica matt, such as General Electric mica matt tape No. 77581, which has been impregnated or coated with an adhesive; or, an adhesive faced silicone rubber tape. A tape material may also be used, such as above described, having an uncured epoxy resin binder which will flow under heat and pressure to form a bond between multiple layers of such tape. Although the heater element of this invention provides good thermal coupling between such element and the surface to be heated because of the intimate contact of the heater element 22 with such surface, the thermal coupling may be increased by using a tape which has been impregnated with silicone oil or other like impregnants. It should be readily apparent that a plurality of tape materials having good flexibility, strength, adhering qualities, voltage breakdown resistance, high temperature characteristics and good heat conductivity properties may be used.

The heat generating resistive electrical conductors, such as 40 and 42, may be variously configured, for example, as shown in FIGURE 2, one such conductor 40 may be generally rectangular in cross-sectional shape and one conductor 42 may be circular in cross-section.

In the exemplary embodiment of the heater element depicted in FIGURE 2 and shown schematically wired to other container components in the wiring schematic of FIGURE 3, two resistive electrical conductors 40 and 42 have been used, with one such conductor 40 having a high resistance rating while the second conductor 42 has a relatively low resistance rating so that the heater element 22 may be utilized with a plurality of voltage power supplies. For example, the high resistance conductor 40 would be used with standard household 117 volt alternating current power while the lower resistance conductor 42 might be used with a low voltage direct current power source such as is available in an automobile, boat, or truck. It should be understood, however, that the heater element 22 may be constructed with only one electrical conductor or more than two such electrical conductors respectively having either like or different resistance ratings.

The exemplary heater elements 22 of FIGURE 2, as wired into the exemplary container of FIGURE 1, has been shown schematically in FIGURE 3 wherein one end of each conductor 40 and 42 of said heater element 22 is connected to a separate socket of the connector receptacle 24 and the other end of such conductors are electrically connected to each other and to a third socket of the connector receptacle 24 through the thermostat 26. By so connecting the electrical conductors 40 and 42, selection of the particular electrical conductor to be connected to the available voltage power supply is facilitated. For example, to energize the heated container from an automobile power source, an extension cord having at one end a connector adapted to plug into the automobile cigarette lighter and at the other end a male connector with protruding pins adapted to engage sockets 2, 3, and 4 as shown in the wiring schematic of FIGURE 3, of the receptacle 24 thereby energizing the low resistance conductor 42; or, if the heated container is to be energized using standard 117 volt alternating current household power, an extension cord having at one end a standard two prong connector adapted for insertion into a standard household wall outlet and at the other end a male connector having protruding pins which are adapted to engage sockets 1, 3, and 4, of the connector receptacle 24, as shown in the wiring schematic of FIGURE 3, thereby energizing the high resistance conductor 40. Accordingly, selection of the particular resistive conductor to be used is accomplished by simply selecting the connecting extension cord. However, it should be understood that the heated container may be provided with other means of selecting the particular resistive conductor to be used such as a switch which connects, alternatively, either one resistive conductor or the other to one socket of a three socket connector receptacle.

Although the exemplary embodiment of the heater element has been depicted and described as having two resistive conductors, either of which may be connected in series, it should be understood that the heater element may contain only one electrical conductor or more than two electrical conductors and such conductors may be connected simultaneously in parallel. Further, although the exemplary heated container has been shown and described as having one continuous heater element 22 wrapped about the external surface of the inner wall 18, it should be understood that a plurality of heater elements may be used and such elements may be connected in parallel or in series.

The heater element of this invention has the advantage of permitting economical fabrication of heated containers. Since the heater element is self-adhering or supporting, it may be applied to the surface to be heated by merely placing the element thereon. Because the element is in intimate contact with the surface to be heated, good heat transfer or surface warm up results. Since the heater element is in tape form considerable flexibility in density of application result. For example, in the exemplary heated container of FIGURE 1, each coil of the heater element 22 may abut the preceding coil, so that upon completion of wrapping, the external surface of the inner wall 18 is entirely covered by the heater element; or, the heater element 22 may be wrapped about the inner wall 18 so that spaces exist between successive heater element coils.

Another advantage of the heated container disclosed herein is uniformity in heating. Because the heater element 22 is wrapped along the entire length and on four sides of the external surface of the inner wall 18, uniform heating results. Although the exemplary container of FIGURE 1 has been depicted and described as having the heating element 22 wrapped about only four walls thereof with no heating element on the inner wall opposite the door 14, it should be understood that the heater element may be applied to such wall in, for example, a serpentine pattern.

While the preferred form and variation of the invention have been described, it should be understood that suitable other additions, alterations, and variations may be made without departing from the invention's fundamental theme.

I claim:
1. A container having an inner and outer wall, at least one heating element attached to the external surface of said inner wall, insulating material between said heating elements and the internal surface of said outer wall, said heating elements including a first strip of electrical insulating tape adhering to the external surface of said inner wall, at least one resistive electrical conductor member adhering to, paralleling and co-extensive with the external surface of said first tape strip, a second strip of electrical insulating tape adhering to, overlying and co-extensive with said first tape strip and said resistive electrical conductor, said tape strips together enclosing said conductor therebetween said heating element containing a first high resistance electrical conductor and a second low resistance electrical conductor adhered in spaced parallel relationship to said external surface of said first tape strip so that said container may be heated using more than one voltage power source.

2. The structure of claim 1 further characterized in that said container contains connective selection means whereby either one of said electrical conductors may be selected and connected to an electrical power source.

3. The structure of claim 1 further characterized in that said container contains a temperature sensing regulating element connected to said conductor which substantially maintains the temperature within said container at a preselected temperature.

4. A container including a continuous sidewall, a closure wall swingably joining one edge of said sidewall, said walls being formed of spaced inner and outer metal sheets, insulation material between said sheets and an elongated heating element wrapped about and adhering to the external surface of the inner metal sheet of said sidewall, said heater element comprising a first elongated strip of electrical insulating tape, at least one resistive electrical conductor adhered to the said first tape strip and a second elongated electrical insulating tape strip adhered to and overlying said first tape strip and said conductor, said conductor and said first and second tape strips being substantially co-extensive in length, and a temperature sensing regulating element secured to said conductor and penetrating said outer sheet, said heater element comprising a plurality of electrical conductors, each such conductor having a different resistance rating, said conductors adhered to said first side of said first tape strip in spaced parallel relationship, with said container including connective and selection means whereby any of said electrical conductors may be selected and connected to an electrical power source.

5. A portable heater including: a continuous sidewall; said sidewall forming a container having an opening; a closure wall swingably attached to said container adjacent a sidewall edge forming said opening; means for retaining said closure wall in a position closing said container opening; at least one handle attached to said continuous sidewall; said walls being formed of spaced inner and outer sheets; insulation material between said sheets and an elongated heating element wrapped about and adhering to the external surface of said inner sheet; said heating element comprising a first elongated strip of electrical insulating tape, a plurality of electrical conductors, each such conductor having a different resistance rating; said conductors adhered in spaced parallel relationship to one surface of said first tape strip, and a second strip of electrical insulating tape adhered to and overlying said first strip and said conductors, said conductors and said first and second tape strips being substantially co-extensive in length; connector and selection means for optionally electrically connecting one of said resistive electrical conductors to multiple external voltage power sources; and a temperature sensing regulating element secured to said conductors and penetrating said outer sheet for use in substantially maintaining a preselected temperature within said container.

References Cited

UNITED STATES PATENTS

| | | | |
|---|---|---|---|
| 822,270 | 6/1906 | Haagn | 219—406 X |
| 2,505,117 | 4/1950 | Hoffmann | 219—407 X |
| 3,004,130 | 10/1961 | Miller | 219—386 X |
| 3,019,325 | 1/1962 | Clouse | 219—546 X |
| 3,029,303 | 4/1962 | Severino | 174—117 X |

BERNARD A. GILHEANY, *Primary Examiner.*

H. B. GILSON, *Assistant Examiner.*